United States Patent
Kim et al.

(10) Patent No.: US 11,909,672 B2
(45) Date of Patent: *Feb. 20, 2024

(54) METHOD AND APPARATUS FOR PERFORMING SIGNALING FOR RESERVED SUB-BAND IN WIRELESS COMMUNICATION SYSTEM

(71) Applicant: LG ELECTRONICS INC., Seoul (KR)

(72) Inventors: Jeongki Kim, Seoul (KR); Jinyoung Chun, Seoul (KR); Hangyu Cho, Seoul (KR); Jinsoo Choi, Seoul (KR); Kiseon Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 334 days.

This patent is subject to a terminal disclaimer.

(21) Appl. No.: 17/222,320

(22) Filed: Apr. 5, 2021

(65) Prior Publication Data

US 2021/0226747 A1   Jul. 22, 2021

Related U.S. Application Data

(63) Continuation of application No. 16/549,980, filed on Aug. 23, 2019, now Pat. No. 11,005,611, which is a
(Continued)

(51) Int. Cl.
*H04L 5/00* (2006.01)
*H04J 11/00* (2006.01)
(Continued)

(52) U.S. Cl.
CPC .......... *H04L 5/0007* (2013.01); *H04J 11/005* (2013.01); *H04L 5/0037* (2013.01);
(Continued)

(58) Field of Classification Search
CPC ... H04L 5/0007; H04L 5/0094; H04L 5/0096; H04J 11/005; H04W 74/006
See application file for complete search history.

(56) References Cited

U.S. PATENT DOCUMENTS 8,891,457 B2   11/2014   Zhang et al.
10,432,364 B2   10/2019   Kim et al.
(Continued)

FOREIGN PATENT DOCUMENTS

EP   2741431   6/2014
EP   3185497   6/2017

OTHER PUBLICATIONS

United States Patent and Trademark Office U.S. Appl. No. 15/505,906, Final Office Action dated Feb. 8, 2019, 11 pages.
(Continued)

*Primary Examiner* — Rhonda L Murphy
(74) *Attorney, Agent, or Firm* — LEE, HONG, DEGERMAN, KANG & WAIMEY

(57) ABSTRACT

A wireless communication system and, more particularly, to a method for performing efficient signaling for a reserved sub-band in a wireless LAN system, and a method and an apparatus for signal transmission using the same. To this end, an STA provides resource allocation information for transmitting data to a plurality of STAs using an orthogonal frequency divisional multiple access (OFDMA) or multiple user MIMO (MU-MIMO) method; transmits the resource allocation information to the plurality of STAs; and transmits data to the plurality of STAs according to the resource allocation information. The entire frequency band may include a sub-band which is not used for the data transmission, and it is preferable that the resource allocation information includes a resource allocation bitmap having a form common to the plurality of STAs and indication information which informs a sub-band, from among the entire frequency band, which is not used for the data transmission.

10 Claims, 9 Drawing Sheets

Related U.S. Application Data continuation of application No. 15/505,906, filed as application No. PCT/KR2015/008743 on Aug. 21, 2015, now Pat. No. 10,432,364.

(60) Provisional application No. 62/040,430, filed on Aug. 22, 2014.

(51) Int. Cl.
*H04W 74/00* (2009.01)
*H04W 84/12* (2009.01)

(52) U.S. Cl.
CPC .......... *H04L 5/0094* (2013.01); *H04L 5/0096* (2013.01); *H04W 74/006* (2013.01); *H04W 84/12* (2013.01)

(56) References Cited

U.S. PATENT DOCUMENTS

| | | |
|---|---|---|
| 2010/0220683 A1 | 9/2010 | Novak et al. |
| 2010/0260138 A1 | 10/2010 | Liu et al. |
| 2011/0013568 A1 | 1/2011 | Yim et al. |
| 2011/0292919 A1 | 12/2011 | Trainin et al. |
| 2012/0314697 A1 | 12/2012 | Noh et al. |
| 2012/0327915 A1* | 12/2012 | Kang .................... H04L 5/0053 370/336 |
| 2013/0286959 A1 | 10/2013 | Lou et al. |
| 2014/0079003 A1 | 3/2014 | Noh et al. |
| 2014/0086200 A1 | 3/2014 | Seok |
| 2017/0279570 A1 | 9/2017 | Kim et al. |
| 2020/0014505 A1 | 1/2020 | Kim et al. |

OTHER PUBLICATIONS

United States Patent and Trademark Office U.S. Appl. No. 15/505,906, Office Action dated Jul. 26, 2018, 18 pages.
United States Patent and Trademark Office U.S. Appl. No. 16/549,980, Office Action dated Jul. 9, 2020, 10 pages.
1 European Patent Office Application Serial No. 21167125.0, Search Report dated May 3, 2021, 9 pages.
PCT International Application No. PCT/KR2015/008743, Written Opinion of the International Searching Authority dated Dec. 10, 2015, 19 pages.
European Patent Office Application Serial No. 15833525.7, Search Report dated Feb. 8, 2018, 10 pages.

\* cited by examiner (a)

(b)

METHOD AND APPARATUS FOR PERFORMING SIGNALING FOR RESERVED SUB-BAND IN WIRELESS COMMUNICATION SYSTEM

CROSS-REFERENCE TO RELATED APPLICATIONS

This application is a continuation of U.S. patent application Ser. No. 16/549,980, filed on Aug. 23, 2019, which is a continuation of U.S. patent application Ser. No. 15/505,906, filed on Feb. 22, 2017, now U.S. Pat. No. 10,432,364, which is the National Stage filing under 35 U.S.C. 371 of International Application No. PCT/KR2015/008743, filed on Aug. 21, 2015, which claims the benefit of U.S. Provisional Application No. 62/040,430, filed on Aug. 22, 2014, the contents of which are all hereby incorporated by reference herein in their entirety.

TECHNICAL FIELD

The following description relates to a wireless communication system and, more particularly, to a method of efficiently signaling unused subbands in a wireless local area network (WLAN) and a signal transmission apparatus and method using the same.

BACKGROUND ART

Although the below-described signal transmission methods are applicable various wireless communication systems, a wireless local area network (WLAN) system will be described as an example of a system, to which the present invention is applicable.

Standards for the WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

Since the above-described standards for the WLAN technology maximally use bandwidth of 160 MHz and support eight spatial streams, IEEE 802.11ax standardization is being discussed in addition to IEEE 802.11ac standard maximally supporting a rate of 1 Gbit/s.

DISCLOSURE

Technical Problem

An object of the present invention is to provide a method of, at a station, efficiently transmitting a signal in a wireless communication system and an apparatus therefor.

More specifically, in IEEE 802.11ax which is a next-generation wireless local area network (WLAN) among wireless communication systems, a resource allocation method using orthogonal frequency divisional multiple access (OFDMA) or multi-user multiple input multiple output (MIMO) is efficiently defined.

Another object of the present invention is to acquire various effects understood from the detailed description of the present invention in addition to the above-described object.

Technical Solution

The object of the present invention can be achieved by providing a method for a first station (STA) to communicate signals in a wireless local area network (WLAN), the method comprising preparing resource allocation information for data to be transmitted to or received from a plurality of STAs and transmitting the resource allocation information to the plurality of STAs, wherein the data is transmitted to or received from the plurality of STAs through a frequency band according to the resource allocation information, wherein the frequency band includes a null subband which is not used to transmit or receive the data, and wherein the resource allocation information includes a common resource allocation bitmap for the plurality of STAs and indication information indicating the null subband.

The resource allocation bitmap may indicate a subband configuration which is a resource allocation unit in the entire frequency band, depending on whether a subsequent bit is toggled from a preceding bit in the resource allocation bitmap.

If a first subsequent bit is not toggled from a first preceding bit in the resource allocation bitmap, a subband corresponding to the first preceding bit and a subband corresponding to the first subsequent bit may be allocated to the same STA, and, if a second subsequent bit is toggled from a second preceding bit in the resource allocation bitmap, a subband corresponding to the second preceding bit and a subband corresponding to the second subsequent bit may be allocated to different STAs.

The indication information indicating the subband which is not used to transmit the data may include a null allocation field indicating that a subband preceding a subband allocated to a corresponding STA among the plurality of STAs indicates a null subband.

The resource allocation information may further include information indicating order of allocating a plurality of subbands within the frequency band to the plurality of STAs.

The resource allocation information may include ID fields, on each subband, for indicating identification information of an STA, to which each subband is allocated, among the plurality of STAs, and/or information on a size of a subband allocated to each STA. In this case, the indication information indicating the null subband can be indicated based on a specific value of the ID field. The specific value may be a value other than values representing identifiers of the plurality of STAs. The specific value of the ID field on a specific subband, among a plurality of subbands within the frequency band, can indicate that the specific subband is the null subband. On the other hand, the identification field on other subband, other than the specific subband, having a value corresponding to an identifier of a specific STA among the plurality of STAs may indicate that the other subband is not the null subband and the other subband is allocated to the specific STA.

The first station can be an AP (Access Point).

Here, the AP may transmit the resource allocation information to the plurality of STAs to solicit transmission of the data from the plurality of STAs. Or, the AP may transmit the resource allocation information to the plurality of STAs to transmit the data to the plurality of STAs.

The resource allocation information may further include an MU indicator indicating whether a data transmission scheme indicates an OFDMA or MU-MIMO scheme.

In another aspect of the present invention, provided herein is a station (STA) for communicating signals in a wireless local area network (WLAN) including a processor configured to prepare resource allocation information for data to be transmitted to or received from a plurality of STAs and a transceiver connected to the processor and configured to transmit the resource allocation information to the plurality of STAs, wherein the data is transmitted to or received from the plurality of STAs through a frequency band according to the resource allocation information, wherein the frequency band includes a null subband which is not used to transmit or receive the data, and wherein the processor allows the resource allocation information to include a common resource allocation bitmap for the plurality of STAs and indication information indicating the null subband.

At this time, the resource allocation bitmap may indicate a subband configuration which is a resource allocation unit in the entire frequency band, depending on whether a subsequent bit is toggled from a preceding bit in the resource allocation bitmap.

More specifically, if a first subsequent bit is not toggled from a first preceding bit in the resource allocation bitmap, a subband corresponding to the first preceding bit and a subband corresponding to the first subsequent bit may be allocated to the same STA, and, if a second subsequent bit is toggled from a second preceding bit in the resource allocation bitmap, a subband corresponding to the second preceding bit and a subband corresponding to the second subsequent bit may be allocated to different STAs.

The indication information indicating the subband which is not used to transmit the data may include a null allocation field indicating that a subband preceding a subband allocated to a corresponding STA among the plurality of STAs indicates a null subband.

The resource allocation information may further include information indicating order of allocating a plurality of subbands to the plurality of STAs.

The resource allocation information may include ID fields, one each subband, for indicating identification information of an STA, to which each subband is allocated, among the plurality of STAs, and/or information on a size of a subband allocated to each STA.

The indication information indicating the null subband may be indicated based on a specific value of the ID field.

The specific value of the ID field on a specific subband, among a plurality of subbands within the frequency band, may indicate that the specific subband is the null subband.

Advantageous Effects

According to the present invention, a station can efficiently transmit a signal in a wireless communication system. More specifically, in IEEE 802.11ax which is a next-generation wireless local area network (WLAN) among wireless communication systems, it is possible to efficiently perform a resource allocation method using orthogonal frequency divisional multiple access (OFDMA) or multi-user multiple input multiple output (MIMO).

The effects which can be obtained by the present invention are not limited to the above-described effects and other effects which are not described herein will become apparent to those skilled in the art from the following description.

BEST MODE

Figure 1:
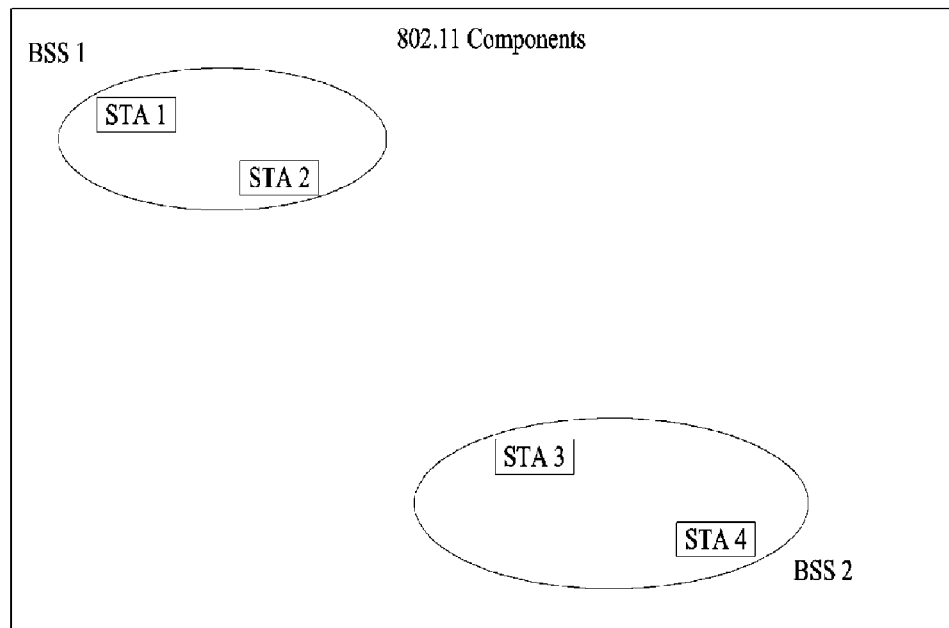
FIG. 1 is a diagram illustrating an exemplary configuration of a Wireless Local Area Network (WLAN) system.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced. The detailed description includes details for the purpose of providing an understanding of the present invention. However, it will be apparent to those skilled in the art that these teachings may be implemented and practiced without these specific details.

The following embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed to another. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to another format within the technical scope or spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

Exemplary embodiments of the present invention are supported by standard documents disclosed for at least one of radio access systems including an Institute of Electrical and Electronics Engineers (IEEE) 802 system, a 3$^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminology used herein may be supported by at least one of the above-mentioned documents.

The following technologies can be applied to a variety of radio access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied as wireless (or radio) technology such as UTRA (Universal Terrestrial Radio Access) or CDMA2000. TDMA may be embodied as wireless (or radio) technology such as GSM (Global System for Mobile communications)/GPRS (General Packet Radio Service)/EDGE (Enhanced Data Rates for GSM Evolution). OFDMA may be embodied as wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA).

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

In the entire specification, when a certain portion "includes" a certain component, this indicates that the other components are not excluded, but may be further included unless specially described. The terms "unit", "-or/er" and "module" described in the specification indicate a unit for processing at least one function or operation, which may be implemented by hardware, software and a combination thereof.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBS S).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
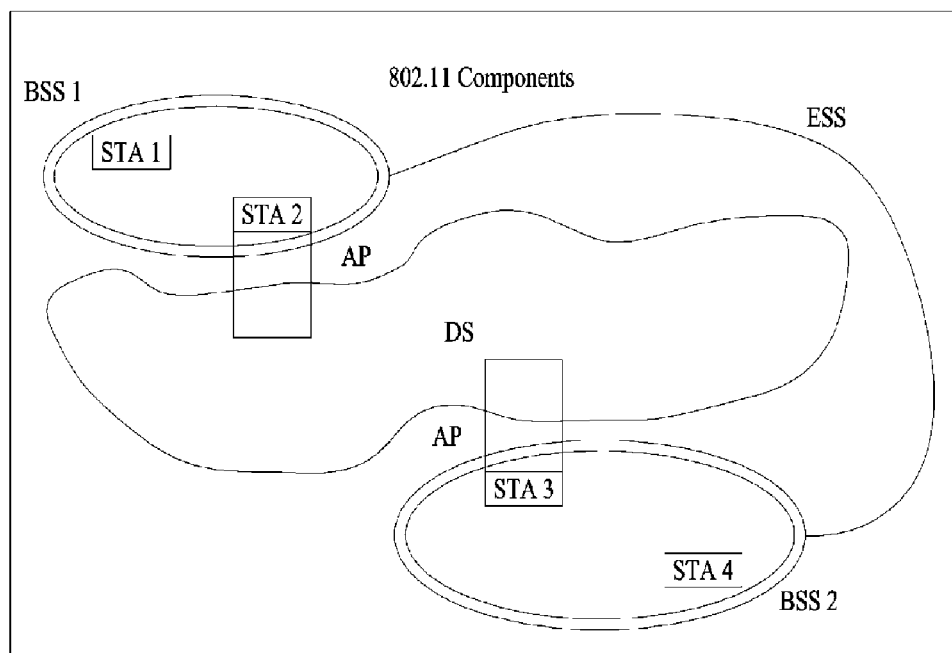
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Figure 3:
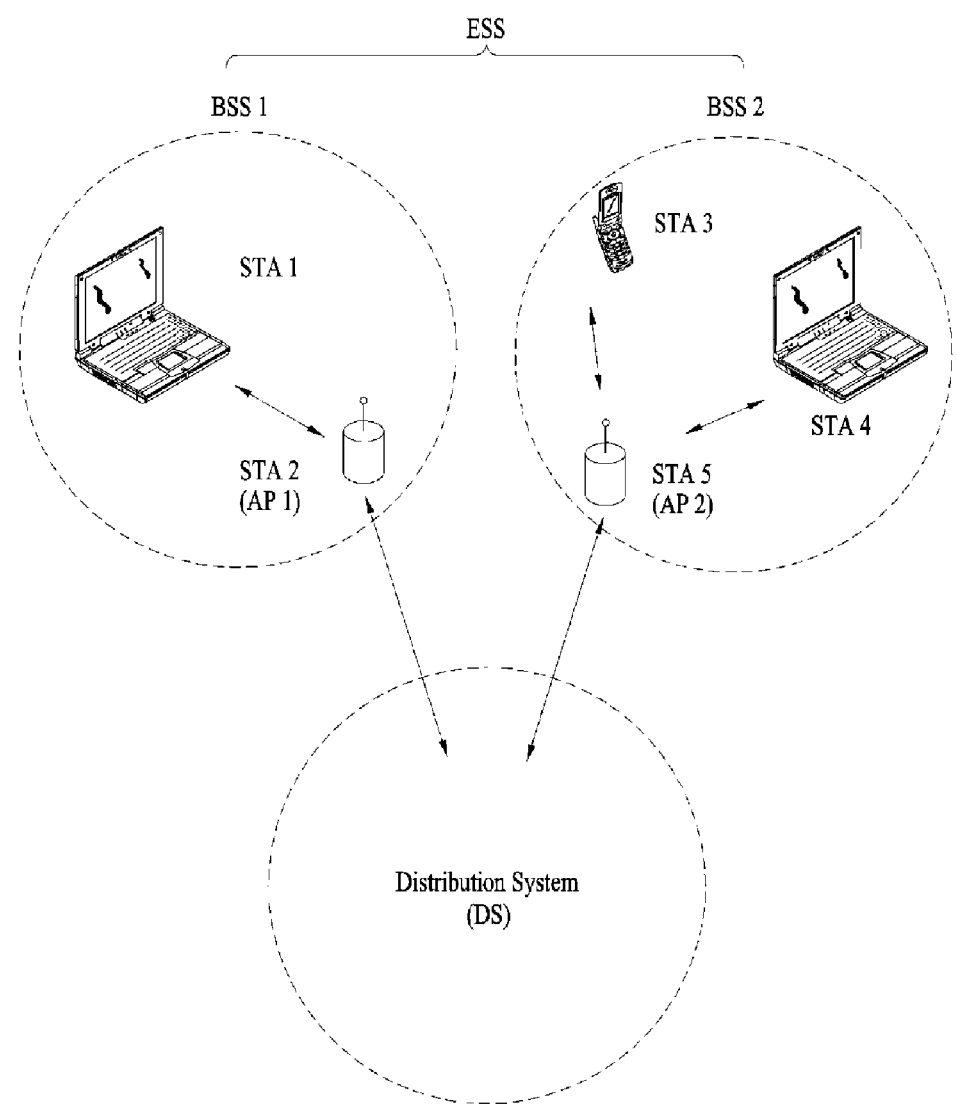
FIG. 3 is a diagram illustrating an exemplary structure of a WLAN system.
Figure 4:
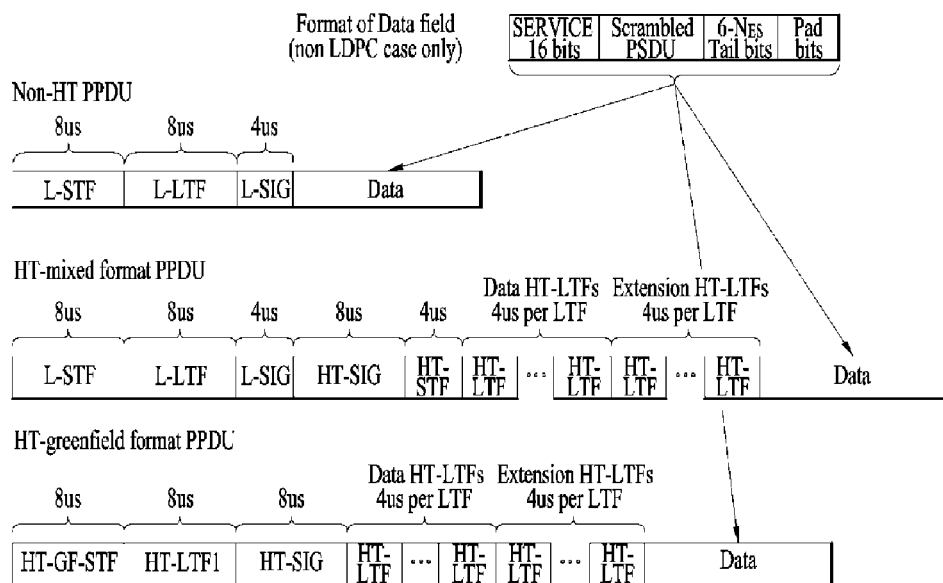
FIGS. 4 to 8 are diagrams illustrating an example of a frame structure used in an IEEE 802.11 system.

FIG. 3 is a diagram illustrating an exemplary structure of a WLAN system. FIG. 3 shows an example of an infrastructure BSS including a DS.

In the example of FIG. 3, BSS1 and BSS2 configure an ESS. In the WLAN system, a station operates according to MAC/PHY rules of IEEE 802.11. The station includes an AP station and a non-AP station. The non-AP station corresponds to an apparatus directly handled by a user, such as a laptop or a mobile telephone. In the example of FIG. 3, a station 1, a station 3 and a station 4 are non-AP stations and a station 2 and a station 5 are AP stations.

In the following description, the non-AP station may be referred to as a terminal, a wireless transmit/receive unit (WTRU), a user equipment (UE), a mobile station (MS), a mobile terminal, a mobile subscriber station (MSS), etc. In addition, the AP corresponds to a base station (BS), a node-B, an evolved node-B (eNB), a base transceiver system (BTS), a femto BS, etc. in different wireless communication fields.

FIGS. 4 to 8 are diagrams illustrating an example of a frame structure used in an IEEE 802.11 system.

An STA may receive a physical layer packet data unit (PPDU). At this time, the PPDU frame format may include a short training field (STF), a long training field (LTF), a signal (SIG) field and a data field. At this time, for example, the PPDU frame format may be set based on the type of the PPDU frame format.

For example, a non-high throughput (HT) PPDU frame format may include a legacy-STF (L-STF), a legacy-LTF (L-LTF), an SIG field and a data field.

In addition, any one of an HT-mixed format PPDU and an HT-Greenfield format PPDU may be set as the type of the PPDU frame format. At this time, in the above-described PPDU format, additional (different types of) STFs, LTFs and SIG fields may be included between the SIG field and the data field.

Figure 5:
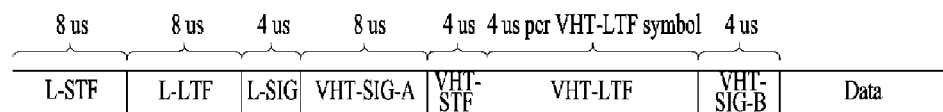

In addition, referring to FIG. 5, a very high throughput (VHT) PPDU format may be set. At this time, even in the VHT PPDU format, additional (different types of) STFs, LTFs and SIG fields may be included between the SIG field and the data field. More specifically, in the VHT PPDU format, at least one of a VHT-SIG-A field, a VHT-STF field, a VHT-LTF field and a VHT SIG-B field may be included between the L-SIG field and the data field.

At this time, the STF is a signal for signal detection, automatic gain control (AGC), diversity selection, accurate time synchronization, etc. and the LTF is a signal for channel estimation, frequency error estimation, etc. A combination of the STF and the LTF may be referred to as a PLCP preamble and the PLCP preamble may refer to a signal for synchronization and channel estimation of an OFDM physical layer.

Figure 6:
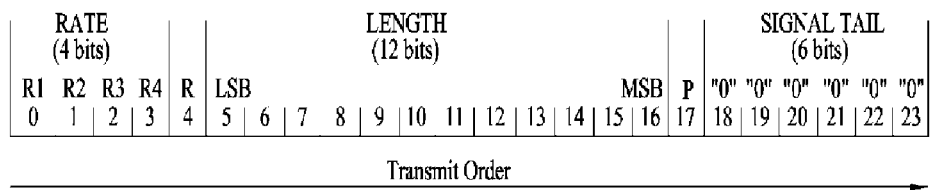

Referring to FIG. 6, the SIG field may include a RATE field and a LENGTH field. The RATE field may include information about modulation and coding rate of data. The LENGTH field may include information about the length of data. Additionally, the SIG field may include a parity bit, an SIG TAIL bit, etc.

The data field may include a SERVICE field, a PLCP service data unit (PSDU) and a PPDU Tail bit and further may include a padding bit if necessary.

Figures 7, 8:
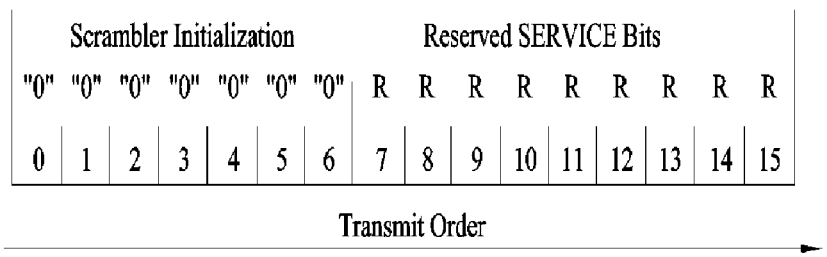

Referring to FIG. 7, some bits of the SERVICE field may be used for synchronization of a descrambler in a receiver, and some bits may be composed of reserved bits. The PSDU corresponds to a MAC protocol data unit (PDU) defined at a MAC layer and may include data created/used at a higher layer. The PPDU TAIL bit may be used to return an encoder to a zero state. The padding bit may be used to adjust the length of the data field to a predetermined length.

In addition, for example, as described above, the VHT PPDU format may include the additional (different types of) STF, LTF and SIG fields. At this time, in the VHT PPDU, L-STF, L-LTF and L-SIG may be a part of non-VHT of the VHT PPDU. At this time, in the VHT PPDU, VHT-SIG-A, VHT-STF, VHT-LTF and VHT-SIG-B may be part of VHT. That is, in the VHT PPDU, regions for a Non-VHT field and a VHT field may be defined. At this time, for example, VHT-SIG-A may include information for interpreting the VHT PPDU.

At this time, for example, referring to FIG. 8, VHT-SIG-A may be composed of VHT SIG-A1 ((a) of FIG. 8) and VHT SIG-A2 ((b) of FIG. 8). At this time, each of VHT SIG-A1 and VHT SIG-A2 may include 24 data bits and VHT SIG-A1 may be transmitted earlier than VHT SIG-A2. At this time, VHT SIG-A1 may include a BW field, an STBC field, a Group ID field, an NSTS/Partial AID field, a TXOP_PS_NOT_ALLOWED field and a Reserved field. In addition, VHT SIG-A2 may include a Short GI field, a Short GI NSYM Disambiguation field, an SU/MU[0] Coding field, an LDPC Extra OFDM Symbol field, an SU VHT-MCS/MU[1-3] Coding field, a Beamformed field, a CRC field, a Tail field and a Reserved field. Through this, information on the VHT PPDU may be confirmed.

Figure 9:
FIG. 9 is a diagram showing an example of a PPDU format which may be used in the present invention.
Figure 9:
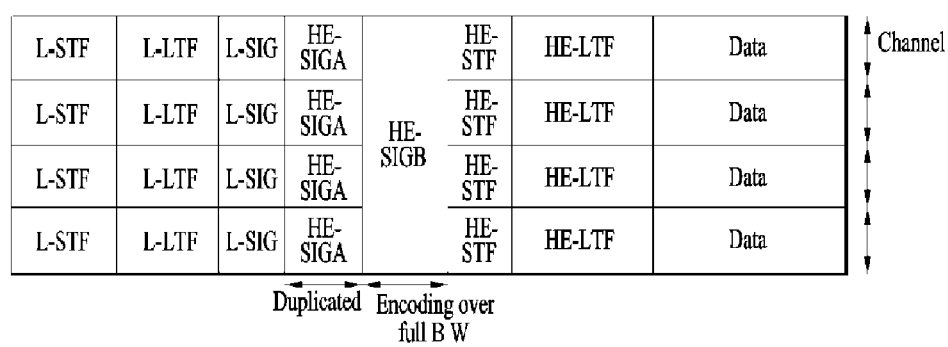

FIG. 9 is a diagram showing an example of a PPDU format which may be used in the present invention.

As described above, various types of PPDU formats may be set. At this time, as an example, a new type of PPDU format may be proposed. The PPDU may include an L-STF field, an L-STF field, an L-SIG field and a data field. For example, a PPDU frame may further include a high efficiency (HE) SIG-A field, a HE-STF field, a HE-LTF field and a HE SIG-B field. For example, the HE SIG-A field may include common information. For example, the common information may include a bandwidth field, a guard interval (GI) field, a length field and a BSS color field. For example, an L-part (L-STF, L-LTF and L-SIG) may be transmitted in the form of an SFN in units of 20 MHz in the frequency domain. In addition, for example, the HE SIG-A field may be transmitted in the form of an SFN in units of 20 MHz, similarly to the L part. For example, if a channel is greater than 20 MHz, the L parts and the HE SIG-A field may be duplicated and transmitted in units of 20 MHz. In addition, the HE SIG-B field may be UE-specific information. For example, the user-specific information may include station AID, resource allocation information (e.g., allocation size), MCS, Nsts, coding, STBC, TXBF, etc. For example, the HE SIG-B field may be transmitted over the full bandwidth.

For example, referring to (b) of FIG. 9, the PPDU may be transmitted through a band of 80 MHz. At this time, the L part and the HE SIG-A part may be duplicated and transmitted in units of 20 MHz and the HE SIG-B field may be transmitted over the full bandwidth of 80 MHz. However, the above-described transmission method is exemplary and is not limited to the above-described embodiments.

Figure 10:
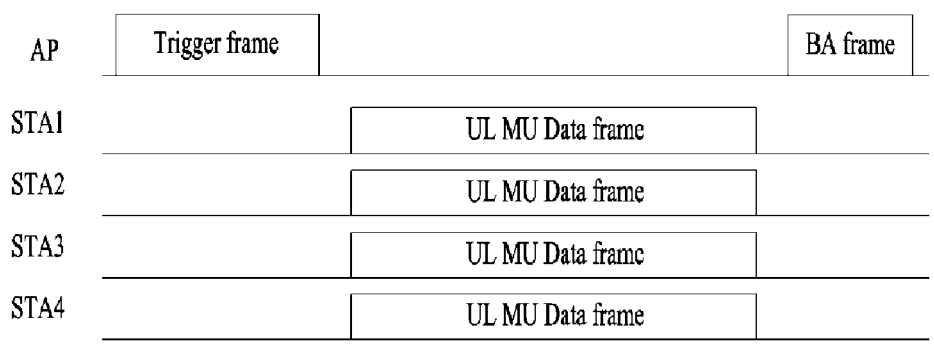
FIG. 10 is a diagram illustrating an uplink among the concepts of multi-user transmission applicable to the present invention.

FIG. 10 is a diagram illustrating an uplink among the concepts of multi-user transmission applicable to the present invention.

As described above, the AP may acquire a TXOP for accessing a medium, occupy the medium through contention and transmit a signal. Referring to FIG. 10, an AP station may transmit a trigger frame to a plurality of stations in order to perform UL MU transmission. At this time, for example, the trigger frame may include information on resource allocation location and size, station IDs, MCS, and MU type (=MIMO or OFDMA). That is, uplink multi-user (UL MU) transmission may mean that a plurality of stations as multiple users performs uplink transmission to the AP station. At this time, the AP station may transmit the trigger frame to the plurality of stations such that the plurality of stations performs uplink data transmission.

The plurality of stations may transmit data to the AP after an SIFS has elapsed, based on a format indicated by the trigger frame. Thereafter, the AP may transmit ACK/NACK information to the station and perform UL MU transmission.

Figure 11:
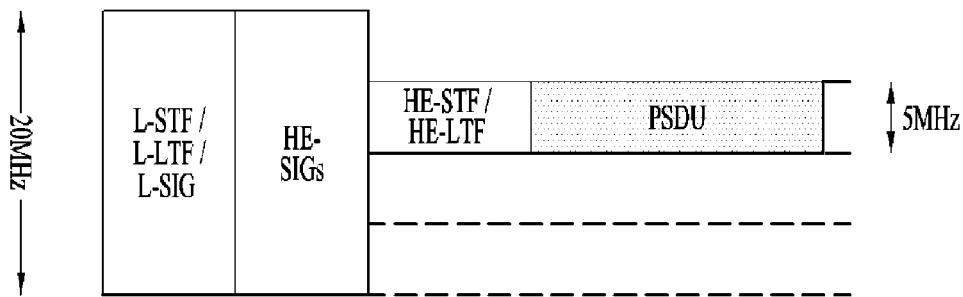
FIG. 11 is a diagram illustrating a station transmitting data using only a partial bandwidth according to an embodiment of the present invention.

FIG. 11 is a diagram illustrating a station transmitting data using only some bandwidths according to an embodiment of the present invention.

As shown in FIG. 11, when the STA transmits a frame, the frame is transmitted using only a partial bandwidth, not a full bandwidth. For example, as shown in FIG. 11, the STA may transmit the frame with a bandwidth (e.g., 5 MHz) less than 20 MHz. In this case, a good subband of 5 MHz in 20 MHz may be selected and used to transmit the frame.

In FIG. 11, the STA transmits data through a second 5-MHz subband. At this time, the STA may transmit, in HE-SIGs, information on through which subband data is transmitted. For example, in the bandwidth information included in HE-SIG, a reception side may be informed of through which subband data is transmitted, through a bitmap of a minimum resource granularity unit.

In the above example, if a resource unit is 5 MHz (e.g., 56 subcarrier tones), since a resource allocation bitmap having a size of 4 bits is configured and transmission is performed through a second resource unit (or subband), the bitmap is 0100 (that is, the frame is transmitted using the second resource unit only). At this time, the bandwidth may be set to 20 MHz.

In association with the above description, hereinafter, examples of a minimum resource granularity unit will be described.

Basic Direction (1) First resource unit? Regular resource unit (RRU) or basic tone unit (BTU); Hereinafter, RRU and BTU are used interchangeably and have the same meaning.

The first resource unit is a large resource unit and, if possible, a BW size of legacy Wi-Fi may be reused (e.g., 26 tones, 56 tones, 114 tones, 242 tones, etc.). The size of the first resource unit may be fixed regardless of BW and increased according to BW.

(2) Second resource unit? Irregular resource unit (IRU) or small tone unit (STU); Hereinafter, IRU and STU are used interchangeably and have the same meaning.

The second resource unit indicates a small resource unit and a method of allocating left/right guard tones for interference mitigation to both ends of a BW and allocating an RRU and an IRU to the remaining region except for central DC tones is defined. If possible, the number of left/right guard tones and DC tones may be maintained regardless of BW (e.g., left/right guard tone=6/5 or 7/6 tones, DC=5 or 3 tones, etc.).

An allocation method and the number of allocated tones may be set in consideration of resource use efficiency, scalability according to BW, etc. In addition, the second resource unit may be predefined and may be delivered through signaling (e.g., SIG) among various methods.

Method 1—BW Common Tone Unit (RRU/BTU Size=56 Subcarriers)

In this method, the size of the RRU/BTU is 56 subcarrier tones.

Figure 12:
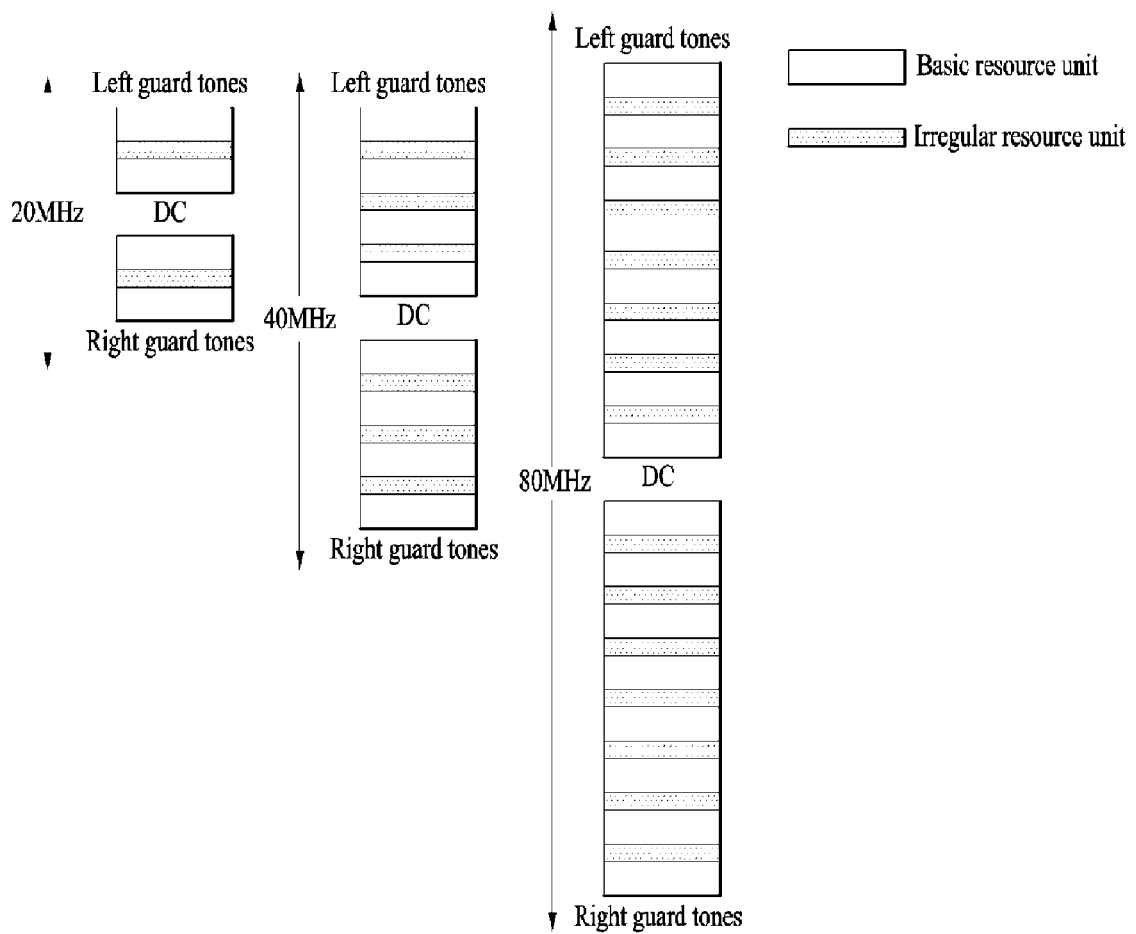
FIG. 12 is a diagram showing an example of defining a minimum resource allocation unit regardless of bandwidth.

FIG. 12 is a diagram showing an example of defining a minimum resource allocation unit regardless of bandwidth.

Since 56 subcarriers are equal to basic OFDM numerology of 20 MHz in a legacy Wi-Fi system, a conventional interleaver may be reused. At this time, the size of the IRU/STU is 8 subcarrier tones. That is, assume that RRU/BTU=56 and IRU/STU=8. However, assume that the minimum allocation unit of the IRU/STU is 2 IRUs/STUs (i.e., 16 tones).

Table 1 below shows the number of RUs, IRUs, and DCs and GIs per BW.

TABLE 1

| BW | # of RU | # of IRU | # of tones of DC + GS |
|---|---|---|---|
| 20 MHZ | 4 (224 tones) | 2 (16 tones) | 16 (DC: 5, GS: 11 or DC: 3, GS: 13) |
| 40 MHZ | 8 (448 tones) | 6 (48 tones) | 16 (DC: 5, GS: 11 or DC: 3, GS: 13) |
| 80 MHZ | 16 (896 tones) | 14 (112 tones) | 16 (DC: 5, GS: 11 or DC: 3, GS: 13) |

As shown in Table 1 above, the number of remaining tones, that is, the number of DCs and GSs, is maintained as 16 (twice the number of IRU tones) regardless of BW.

(RU, IRU)=(56, 9)

If the IRU has a size of 9 subcarriers, per-BW numerology may be as shown in Table 2 below. A 160-MHz BW is obtained by repeatedly applying 80 MHz twice.

TABLE 2

| BW | # of RU | # of IRU | # of tones of DC + GS |
|---|---|---|---|
| 20 MHz | 4 (224 tones) | 2 (18 tones) | 14 (DC: 3, GS: 11) |
| 40 MHZ | 8 (448 tones) | 5 (45 tones) | 19 (DC: 8, GS: 11 or DC: 3, GS: 16) |
| 80 MHz | 16 (896 tones) | 12 (108 tones) | 20 (DC: 3, GS: 17 or DC: 9, GS: 11) |

In addition to the above-described examples, various combinations of (RU, IRU) are possible as follows. For example, (RU, IRU)=(26, 8), (RU, IRU)=(26, 6), (RU, IRU)=(114, 7), etc. may also be possible.

Method 2—Method of Changing RRU Size According to BW (RRU=26/56/114 for 20/40/80 MHz, IRU=7)

In this method, the IRU is fixed to 14 regardless of BW. If two pilot signals are used, 12 data tones are advantageous for various MCS decoding methods. In particular, 80 MHz is advantageous for systematic design because RRU+IRU=114+14=128 is a divisor of 256.

The following tables show values which may be defined for each bandwidth. More specifically, Table 3 shows 80 MHz, Table 4 shows 40 MHz and Table 5 shows 20 MHz.

TABLE 3

| | Number of tones | Number of allocation units | Total number of tones |
|---|---|---|---|
| RRU | 114 | 8 | 912 |
| IRU | 7 | 14 | 98 |
| left guard | | | 6 |
| right guard | | | 5 |
| DC | | | 3 |

TABLE 4

| | Number of tones | Number of allocation units | Total number of tones |
|---|---|---|---|
| RRU | 56 | 8 | 448 |
| IRU | 7 | 6 | 42 |
| left guard | | | 6 |
| right guard | | | 5 |
| DC | | | 11 |

TABLE 5

| | Number of tones | Number of allocation units | Total number of tones |
|---|---|---|---|
| RRU | 26 | 8 | 208 |
| IRU | 7 | 4 | 28 |
| left guard | | | 6 |
| right guard | | | 5 |
| DC | | | 9 |

Hereinafter, a method of efficiently configuring resource allocation information based on the above description will be described.

As described above with respect to FIG. 11, in one embodiment of the present invention, when data is transmitted to a plurality of STAs for OFDMA/MU-MIMO transmission, assume that subbands which are not used for data transmission are included in the full bandwidth. In this state, the resource allocation information may include a common resource allocation bitmap for the plurality of STAs and indication information indicating subbands which are not used for data transmission in the full frequency band.

Hereinafter, examples of indicating the above-described resource allocation information using the HE-SIG field will be described.

TABLE 6

Resource allocation information in HE-SIG field {
   AID
   Resource Allocation Bitmap (e.g., 0100)
   Per user parameter (e.g., Nsts, STBC, MCS, TxBF, Coding)
}

As shown in Table 6 above, the resource allocation information may include a common resource allocation bitmap for a plurality of STAs. The resource allocation bitmap may indicate a subband configuration, which is a resource allocation unit of the entire frequency band, depending on whether a subsequent bit is toggled from a preceding bit in the resource allocation bitmap. More specifically, if a first subsequent bit is not toggled from a first preceding bit in the resource allocation bitmap, a subband (e.g., SB 1) corresponding to the first preceding bit and a subband (e.g., SB 2) corresponding to the first subsequent bit may be allocated to the same STA. In contrast, if a second subsequent bit is toggled from a second preceding bit in the resource allocation bitmap, a subband (e.g., SB 2) corresponding to the second preceding bit and a subband (e.g., SB 3) corresponding to the second subsequent bit may be allocated to different STAs.

The resource allocation bitmap may start from 0 or 1 and Table 6 shows an example in which the resource allocation starts from 0. In the example of Table 6, since a bit subsequent to 0 which is a first bit is toggled to 1, a first SB 1 and a second SB2 are allocated to different STA. In addition, since "0", which is a third bit, is toggled from the preceding bit, the SB 3 is allocated to an STA different from the STA, to which the SB 2 is allocated. In contrast, since "0", which is a fourth bit, is not togged from the preceding bit, an SB 4 corresponding thereto is allocated to the same STA as the SB 3 corresponding to the preceding bit.

In summary, (1) SB 1 is allocated to STA 1, (2) SB 2 is allocated to STA 2, and (3) SBs 3 and 4 are allocated to STA3. If a toggling based bitmap is used, it is possible to efficiently and flexibly allocate resources while reducing signaling overhead of the plurality of STAs. In the above description, it is assumed that the resource allocation order of the STAs may be predetermined in order of STA 1, 2 and 3 or signaled in advance.

The above-described resource allocation information may include the number of allocated streams (Nsts), space-time block coding (STBC), modulation and coding scheme (MCS) as per-user control information as shown in Table 6.

As a modification of Table 6, instead of the resource allocation bitmap, a start offset and an allocation size may be indicated as follows.

TABLE 7

Resource allocation information in HE-SIG field {
   AID
   Start offset (e.g., resource unit (/sub-band) index or starting subcarrier)
   Allocation size (e.g., Total number of resource units/sub-bands or Specific resource unit size)
   Per user parameter (e.g., Nsts, STBC, MCS, TxBF, Coding)
}

The signaling method shown in Table 6 above may cause a problem in the following situations.

Figure 13:
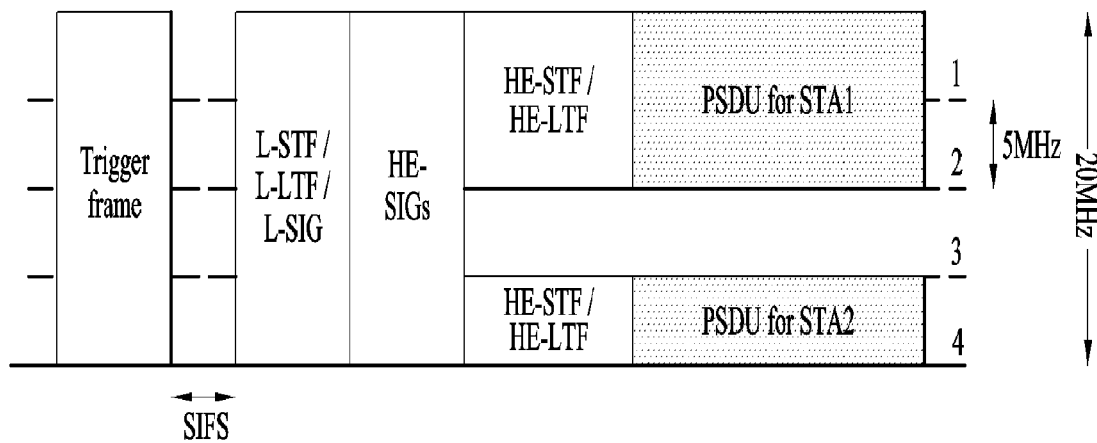
FIG. 13 is a diagram illustrating a method of configuring resource allocation information according to a preferred embodiment of the present invention.

FIG. 13 is a diagram illustrating a method of configuring resource allocation information according to a preferred embodiment of the present invention.

As shown in FIG. 13, when an AP transmits a trigger frame for UL MU (OFDMA), only a specific band may be used. Resource use information may be included and transmitted in the trigger frame.

If it is assumed that SB 1 and SB 2 are allocated to STA 1 and SB 4 is allocated to STA 2 as shown in FIG. 13 and, for convenience, resources are allocated to the plurality of STAs by STA number, the toggling based bitmap may be "1101", because SBs 1 and 2 are allocated to the same STA, SB3 configures an allocation unit different from that of SBs 1 and 2 and SB4 configures an allocation unit different from that of SB3.

If presence of unused SBs in the entire band is not indicated as shown in FIG. 13, the bitmap may be erroneously interpreted as (1) allocation of SBs 1 and 2 to STA 1, (2) allocation of SB 3 to STA 2 and (3) allocation of SB 4 to STA 3.

Accordingly, in one preferred embodiment of the present invention, indication information, indicating subbands which are not used for data transmission, may be further included and a null allocation field indicating whether a subband preceding a subband allocated to a corresponding STA of a plurality of STAs is a null subband may be included.

More specifically, upon UL MU transmission, when the AP transmits a trigger frame to allocate UL OFDMA resources (frame transmission region), a specific subband may be allocated to the STA through subband operation (the STA may perform transmission using a specific subband). At this time, which subband is used and which subband is not used (null resource allocation) may be indicated in the trigger frame.

TABLE 8

Number of STA (N)
For (1: N) {
   Null allocation
   AID
   Per user parameter (e.g., Nsts, STBC, MCS, TxBF, Coding)
}
Resource Allocation Bitmap That is, FIG. 8 shows that resource allocation information may have a user-specific information field and a user common information field, the user-specific information field may indicate presence/absence of "Null allocation" in each of N STAs and AID and per-STA specific parameter information as an STA identifier, and the above-described resource allocation bitmap information may be included as user common information.

On such an assumption, the situation of FIG. 13 is applied. In the example of FIG. 13, a third band is not used. Accordingly, if resource allocation is indicated in the form of a bitmap, the following configuration is possible. At this time, if the value of the null allocation field is 1, it is assumed that null allocation is present before allocation of the AID, but definition of the field value may be changed.

TABLE 9

|  | Null Allocation | AID | Resource Allocation Bitmap |
|---|---|---|---|
| 1st | 0 | STA1's AID | 1101 |
| 2nd | 1 | STA2's AID | |

In Table 9, although the bitmap may be determined to be "1101" as described above, presence of null allocation before allocation to STA 2 may be indicated as null allocation information. Therefore, the bitmap may not be erroneously interpreted as (1) allocation of SBs 1 and 2 to STA 1, (2) allocation of SB 3 to STA 2 and (3) allocation of SB 4 to STA 3, but may be accurately interpreted as (1) allocation of SBs 1 and 2 to STA 1, (2) null allocation of SB 3 and (3) allocation of SB 4 to STA 2, as shown in FIG. 13.

Figure 14:
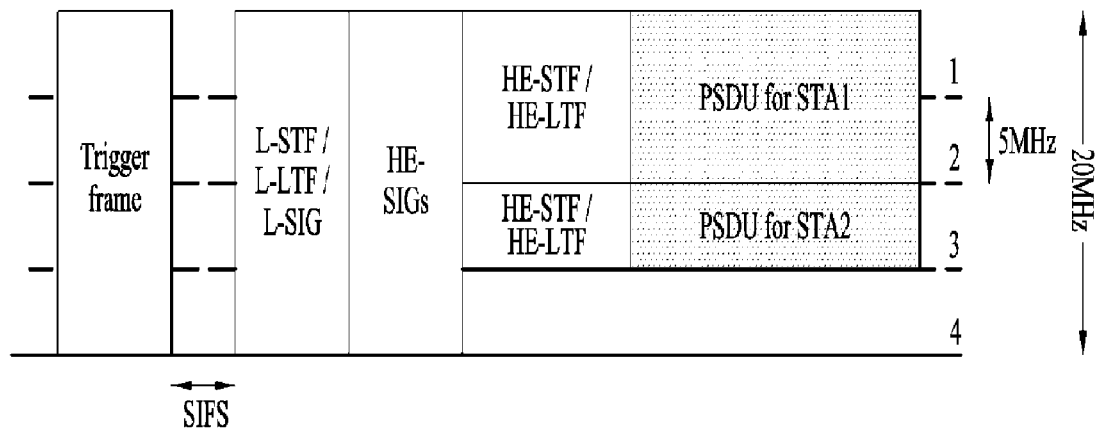
FIGS. 14 to 16 are diagrams showing additional examples for thorough understanding of an embodiment of the present invention.
Figure 15:
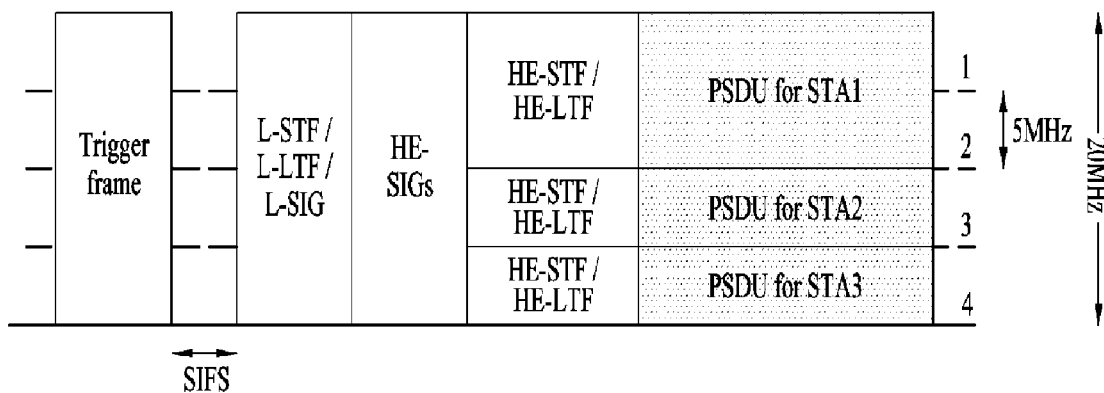
Figure 16:
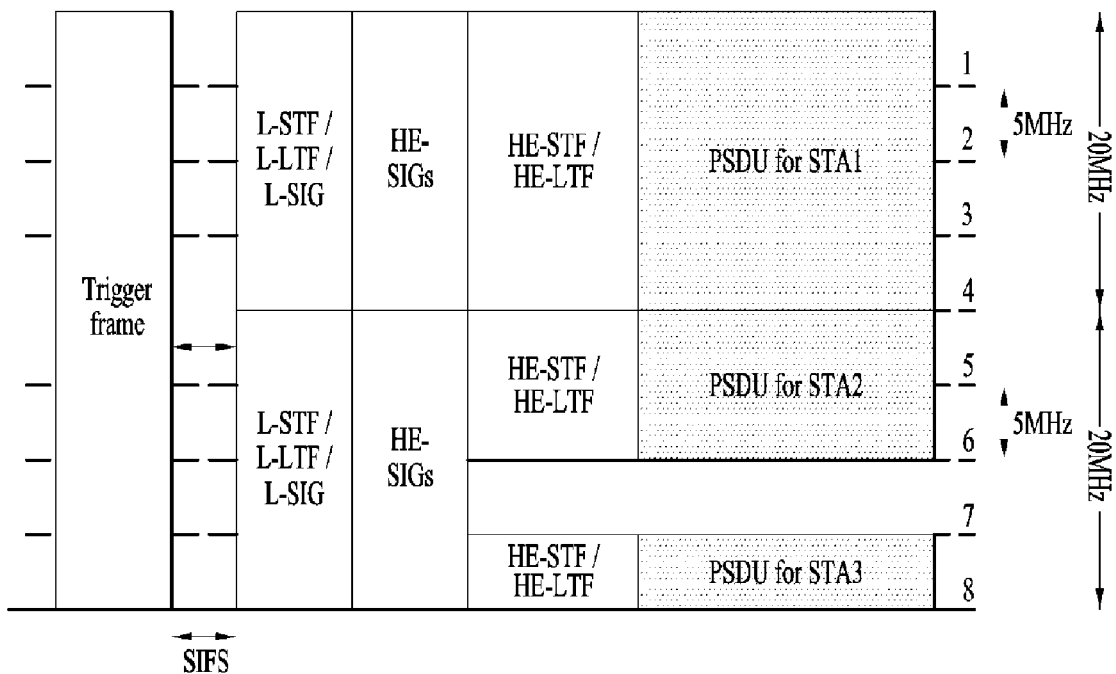

FIGS. 14 to 16 are diagrams showing additional examples for thorough understanding of an embodiment of the present invention.

As shown in FIG. 14, in the case of UL OFDMA allocation, in the trigger frame, the resource allocation bitmap is set to 1101 and the null allocation fields are all set to 0 as shown in the following table.

TABLE 10

|  | Null Allocation | AID | Resource Allocation Bitmap |
|---|---|---|---|
| 1st | 0 | STA1's AID | 1101 |
| 2nd | 0 | STA2's AID | |

In FIG. 14, it can be implicitly seen from the information of Table 10 that last allocation is null allocation. As shown in FIG. 15, if 20-MHz bands are all allocated to STAs 1, 2 and 3, resource allocation information shown in Table 11 below may be transmitted.

TABLE 11

|  | Null Allocation | AID | Resource Allocation Bitmap |
|---|---|---|---|
| 1st | 0 | STA1's AID | 1101 |
| 2nd | 0 | STA2's AID | |
| 3rd | 0 | STA3's AID | |

FIG. 16 shows an example of transmitting a frame using a bandwidth of 40 MHz.

In FIG. 16, a frame is transmitted with a bandwidth of 40 MHz, the size of a resource unit (or subband) is 5 MHz (e.g., 56 tones), and a total number of resource units is 8. At this time, OFDMA resources are allocated to three STAs and a seventh resource unit (subband) is a null allocation unit.

In this example, the size of the resource allocation bitmap is 8 bits and the values of the null allocation field and the resource allocation bitmap field may be set as follows.

TABLE 12

|  | Null Allocation | AID | Resource Allocation Bitmap |
|---|---|---|---|
| 1st | 0 | STA1's AID | 11110010 |
| 2nd | 0 | STA2's AID | |
| 3rd | 1 | STA3's AID | |

Hereinafter, various modifications of the above-described embodiment will be described.

First, instead of inserting the null allocation field to every ID, a null allocation bitmap may be used as follows.

TABLE 13

Number of STA (N)
For (1: N) {
AID
    Per user parameter (e.g., Nsts, STBC, MCS, TxBF, Coding)
}
Resource Allocation Bitmap
Null Allocation Bitmap The size of the null allocation bitmap may be equal to the resource allocation bitmap to indicate which subband (e.g., resource unit) is a null allocation unit. In FIGS. 13 to 15, the sizes of the resource allocation bitmap and the null allocation bitmap may be 4 bits.

In FIG. 16, the sizes of the resource allocation bitmap and the null allocation bitmap may be 8 bits. The following table shows the example (N=3) of FIG. 16.

TABLE 14

|  | AID | Resource Allocation Bitmap | Null Allocation Bitmap |
|---|---|---|---|
| 1st | STA1's AID | 11110010 | 00000010 |
| 2nd | STA2's AID | | |
| 3rd | STA3's AID | | |

The size of the null allocation bitmap may be set to a total number of allocations including null allocation. If the allocation bitmap is included, the size of the null allocation bitmap is determined based on information on the allocation bitmap (the number of toggles+1).

TABLE 15

|  | Resource Allocation Bitmap | Null Allocation Bitmap |
|---|---|---|
| FIG. 13 | 1101 | 010 |
| FIG. 14 | | 001 |
| FIG. 15 | | 000 |
| FIG. 16 | 11110010 | 0010 |

If the number of allocations in the resource allocation bitmap and the number of AIDs are equal, the null allocation bitmap may not be included. In this case, this may be indicated through a 1-bit flag as follows.

TABLE 16

Number of STA (N)
For (1: N) {
    AID
    Per user parameter (e.g., Nsts, STBC, MCS, TxBF, Coding)
}
Resource Allocation Bitmap
NA bitmap presences (1: Null allocation bitmap is included)
If (NA bitmap presences==1) {
    Null Allocation Bitmap
}

Alternatively, if the number of allocations and the number of AIDs are not equal or the number of allocations is greater than the number of AIDs, the null allocation bitmap may be included. If the number of allocations in the resource allocation bitmap and the number of AIDs are equal, the null allocation bitmap may not be included.

TABLE 17

```
Number of STA (N)
For (1: N) {
    AID
    Per user parameter (e.g., Nsts, STBC, MCS, TxBF, Coding)
}
Resource Allocation Bitmap
If (N < Number of allocation (derived by allocation bitmap)) {
    Null Allocation Bitmap
}
```

If resource allocation is indicated in the form of an allocation size, not in the form of a bitmap, similar definition is possible.

Table 18

TABLE 18

```
Number of allocation (M)
For (1: M) {
    Null allocation
    If (Null allocation == 0) {
        AID
        Per user parameter (e.g., Nsts, STBC, MCS, TxBF, Coding)
    }
    Allocation size
}
```

AID may be included only when null allocation is not performed (0). Allocation information is included by the total number of allocations including null allocation.

The following table shows an example of applying FIG. 16.

TABLE 19

| M | Null Allocation | AID | Allocation Size |
|---|---|---|---|
| 1st | 0 | STA1's AID | 4 |
| 2nd | 0 | STA2's AID | 2 |
| 3rd | 1 | Null Allocation | 1 |
| 4th | 0 | STA3's AID | 1 |

Instead of the null allocation field, a specific value which is not used for AID is used for indication. That is, an unallocated value may be used. For example, if all AID bits are set to 0 or 1, this indicates a null allocation value.

TABLE 20

```
Number of AID/allocation (M)
For (1: M) {
    AID
    Allocation size
    Per user parameter (e.g., Nsts, STBC, MCS, TxBF, Coding)
}
```

The following table shows an example of applying the above-described method to FIG. 16.

TABLE 21

| M | AID | Allocation Size |
|---|---|---|
| 1st | STA1's AID | 4 |
| 2nd | STA2's AID | 2 |
| 3rd | Specific AID (e.g. all 0s or all 1s), Null Allocation | 1 |
| 4th | STA3's AID | 1 |

Meanwhile, instead of the null allocation field, the null allocation bitmap may be used.

TABLE 22

```
Number of STA (N)
For (1: N) {
    AID
    Allocation size
    Per user parameter (e.g., Nsts, STBC, MCS, TxBF, Coding)
}
Null allocation bitmap
```

The size of the null allocation bitmap may be determined by a total number of resource units.

The following table shows an example of FIG. 16 when the size of the null allocation bitmap is determined by the total number of resource units.

TABLE 23

| N | AID | Allocation Size | Null allocation bitmap |
|---|---|---|---|
| 1st | STA1's AID | 4 | 00000010 |
| 2nd | STA2's AID | 2 | |
| 3rd | STA3's AID | 1 | |

Which resource unit is a null allocation bitmap may be checked through the null allocation bitmap.

The null allocation bitmap may be configured by the total number of allocations including null allocation, instead of the resource units and indicate how many allocations are present before null allocation. For example, when the total number of allocations including null allocation is 8, the null allocation bitmap has 8 bits, a bit corresponding to null allocation is set to 1 and a bit which does not correspond to null allocation is set to 0, and vice versa (that is, a bit corresponding to null allocation is set to 0 and a bit which does not correspond to null allocation is set to 1). A total number of allocations may be delivered to the STA through HE-SIG.

The above-defined field information (e.g., number of STAs/allocation (N/M), AID, allocation bitmap, null allocation field, null allocation bitmap, NA bitmap presences, etc.) may be included and transmitted in the trigger frame (CTX) carrying an SIG field or resource allocation information or may be transmitted through another frame.

As described above, the proposed methods may be used not only for UL frame transmission but also for DL frame transmission (DL OFDMA/MU(SU)-MIMO).

<Case where OFDMA Transmission and MU-MIMO Transmission are Used Interchangeably>

Figure 17:
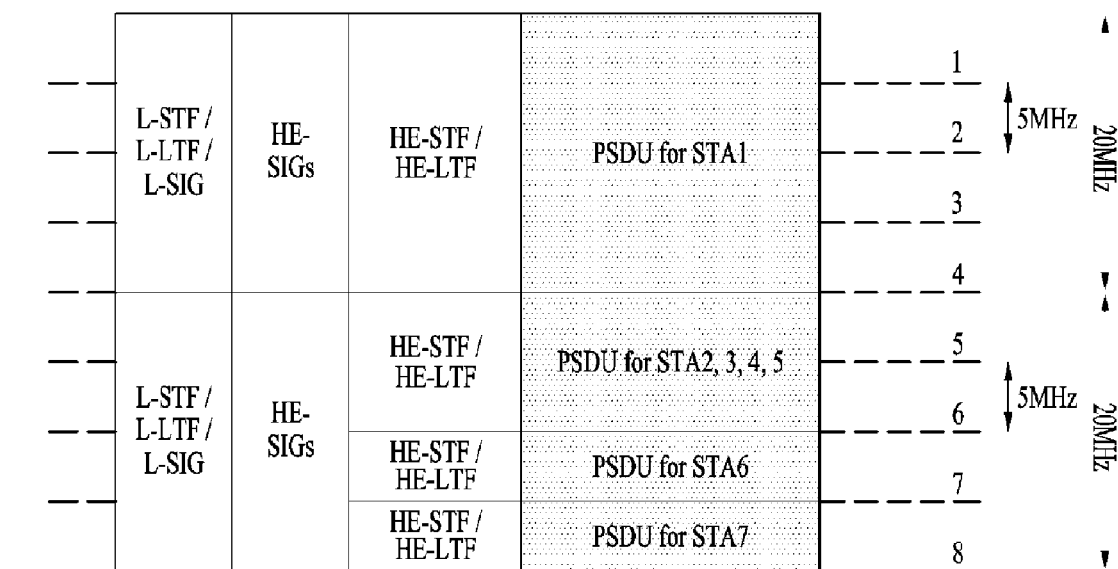
FIG. 17 is a diagram illustrating a method of configuring resource allocation information when DL/UL OFDMA transmission and DL/UL MU-MIMO transmission are used interchangeably in another embodiment of the present invention.

FIG. 17 is a diagram illustrating a method of configuring resource allocation information when DL/UL OFDMA transmission and DL/UL MU-MIMO transmission are used interchangeably in another embodiment of the present invention.

In the example of FIG. 17, a frame corresponding to STA 1 is transmitted through resource units (RUs) 1, 2, 3 and 4 (20 MHz) and frames corresponding to STA 2, STA 3, STA 4 and STA 5 are transmitted through RUs 5 and 6 (10 MHz) using MU-MIMO and frames corresponding to STA 6 and STA 7 are transmitted through RUs 7 and 8 (5 MHz). At this time, resources may be allocated using the following method.

Method 1: Resources are allocated to STAs through the AIDs of the STAs. An example thereof is as follows.

TABLE 24

Resource Allocation Bitmap
Number of STA (N)
For (1: N) {
    MU indication
    AID
    Per user parameter (e.g., Nsts, STBC, MCS, TxBF, Coding)
}

MU indication: This indicates whether allocation of an STA for AID is transmitted using MU-MIMO. A first STA having MU-MIMO indication of 1 becomes a first STA of an MU-MIMO region. MU-MIMO indication of 0 indicates SU transmission.

If MU indication for a preceding STA is set to 1, an STA having MU indication of 1 uses the same resources as the preceding STA. If MU indication for a preceding STA is set to 1, an STA having MU indication of 0 uses a next resource region of a resource region of the preceding STA. The STA may acquire a resource region used thereby through a resource allocation bitmap. The following table shows an example of applying such a method to FIG. 17.

TABLE 25

| N | AID | MU indication | Resource Allocation Bitmap |
|---|---|---|---|
| 1$^{st}$ | STA1's AID | 0 | 11110010 |
| 2nd | STA2's AID | 1 | |
| 3rd | STA3's AID | 1 | |
| 4th | STA4's AID | 1 | |
| 5th | STA5's AID | 1 | |
| 6th | STA6's AID | 0 | |
| 7th | STA7's AID | 0 | |

Through the resource allocation bitmap set to 11110010, it can be seen that a total of four resources is allocated and STAs 1, 6 and 7 are set to MU indication of 0 such that SU transmission is performed and STAs 3, 4 and 5 perform transmission using the same resources as STA 2 using MU-MIMO.

Since the number of contiguous 1s of the MU indication is indicated as one MU-MIMO allocation unit and 0 indicates one SU-MIMO indication, STAs may know a total number of allocations through MU indication information. That is, the total number of allocations is (the total number of MU indications (0)+the number of groups of contiguous MU indications (1)). In the above example, since the number of MU indications (0) is 3 and the number of groups of contiguous MU indications (1) is 1, the total number of allocations is 4.

Another example of using MU indication will now be described.

MU indication: This indicates whether allocation of an STA for AID is transmitted using MU-MIMO. MU-MIMO indication of 0 indicates SU transmission. A first MU STA has MU indication of 0 and an STA having MU indication of 1 uses the same resources as the preceding STA. If MU indication for a preceding STA is set to 1, an STA having MU indication of 0 uses a next resource region of a resource region used by the preceding STA. The STA may acquire a resource region used thereby through a resource allocation bitmap. The following table shows an example of applying such a method to FIG. 17.

TABLE 26

| N | AID | MU indication | Resource allocation bitmap |
|---|---|---|---|
| 1$^{st}$ | STA1's AID | 0 | 11110010 |
| 2nd | STA2's AID | 0 | |
| 3rd | STA3's AID | 1 | |
| 4th | STA4's AID | 1 | |
| 5th | STA5's AID | 1 | |
| 6th | STA6's AID | 0 | |
| 7th | STA7's AID | 0 | |

Instead of the resource allocation bitmap, an allocation size may be used.

TABLE 27

Number of allocation (M)
For (1: M) {
    MU indication
    If (MU indication ==0) {
        AID
        Per user parameter (e.g., Nsts, STBC, MCS, TxBF, Coding)
        Allocation size
    } else {
        Number of STA (N)
        For (1:N) {
            AID
            Per user parameter (e.g., Nsts, STBC, MCS, TxBF, Coding)
        }
        Allocation size
    }
}

With respect to MU-MIMO, a necessary number of pieces of STA information (e.g., AID, MIMO info (Nsts, STBC, etc.)) may be included.

Method 2: When resources are allocated to STAs, one resource is allocated to a single user (e.g., STAs 1, 6 and 7 of FIG. 17) through the AID of the single STA and allocation of MU-MIMO (STAs 2, 3, 4 and 5 of FIG. 17) uses GID.

TABLE 28

Number of allocation (M)
For (1: M) {
    MU-MIMO indication
    If (MU-MIMO indication ==0) {
        AID
        Per user parameter (e.g., Nsts, STBC, MCS, TxBF, Coding)
    }
    Else {
        GID
        For (Max number of STA in GID) {
            Per user parameter (e.g., Nsts, STBC, MCS, TxBF, Coding)
        }
    }
}
Resource Allocation Bitmap Instead of the resource allocation bitmap, an allocation size may be used.

TABLE 29

Number of allocation (M)
For (1: M) {
    MU-MIMO indication
    If (MU-MIMO indication ==0) {
        AID TABLE 29-continued

```
        Per user parameter (e.g., Nsts, STBC, MCS, TxBF,
        Coding)
        Allocation size
    }
    Else {
        GID
        Allocation size
        For (Max number of STA in GID) {
            Per user parameter (e.g., Nsts, STBC, MCS, TxBF,
            Coding)
        }
    }
}
```

Instead of including MU-MIMO indication in each STA, the number of resource allocations may be indicated in the form of a bitmap. A total number of resource allocations may be directly included in HE-SIG or may be checked by the UE based on the resource allocation bitmap.

Each bit of the bitmap indicates whether the resource unit corresponding to the resource allocation corresponding to each bit is allocated using MU-MIMO or SU. Accordingly, the size of the MU-MIMO indication bitmap is determined by the total number of allocations of the resource allocation bitmap. For example, if the total number of allocated OFDMA resources is 8, the MU-MIMO indication bitmap has 8 bits and indicates which resource allocation unit uses MU-MIMO.

In addition, null allocation indication and MU allocation may be used together as follows.

TABLE 30

```
Number of STA and null allocation (N)
For (1: N) {
    If (N>1) {
        Flag (00: SU, 01: MU-MIMO, 10: Null allocation, 11;
        reserved)
        If (Flag==(00||01)) {
            AID
            Per user parameter (e.g., Nsts, STBC, MCS, TxBF, Coding)
        }
    } else {
        AID
        Per user parameter (e.g., Nsts, STBC, MCS, TxBF,
        Coding)
    }
}
Allocation bitmap
```

Another use example is as follows.

TABLE 31

```
Number of STA and null allocation (N)
For (1: N) {
    If (N>1) {
        Flag (00: SU or 1st MU, 10: MU from 2nd MU, 10: Null
        allocation, 11; reserved)
        If (Flag==(00||01)) {
            AID
            Per user parameter (e.g., Nsts, STBC, MCS, TxBF, Coding)
        }
    } else {
        AID
        Per user parameter (e.g., Nsts, STBC, MCS, TxBF,
        Coding)
    }
}
Resource Allocation bitmap
```

In MU-MIMO, if GID is used instead of AID and the allocation size is used instead of the allocation bitmap, the resource allocation information may be configured as follows.

TABLE 32

```
Number of allocation (M)
        For(1: M) {
Flag bit (00: SU allocation, 01: MU-MIMO, 10: Null allocation,
11; reserved)
If (Flag == 00) {
            AID
    Allocation size
    Per user parameter (e.g., Nsts, STBC, MCS, TxBF, Coding)
}
Else If (Flag==(01)) {
    GID
            Allocation size
            For (Max number of STA in GID) {
                Per user parameter (e.g., Nsts, STBC, MCS,
                TxBF, Coding)
            }
    }
}
Number of allocation (M)
    For (1: M) {
        Flag (00: SU or 1st MU, 10: MU from 2nd MU, 10: Null
        allocation, 11; reserved)
If (Flag == 00) {
            AID
    Allocation size
    Per user parameter (e.g., Nsts, STBC, MCS, TxBF, Coding)
}
Else If (Flag==(01)) {
        GID
            Allocation size
            For (Max number of STA in GID) {
                Per user parameter (e.g., Nsts, STBC,
                MCS, TxBF, Coding)
            }
    }
}
```

Figure 18:
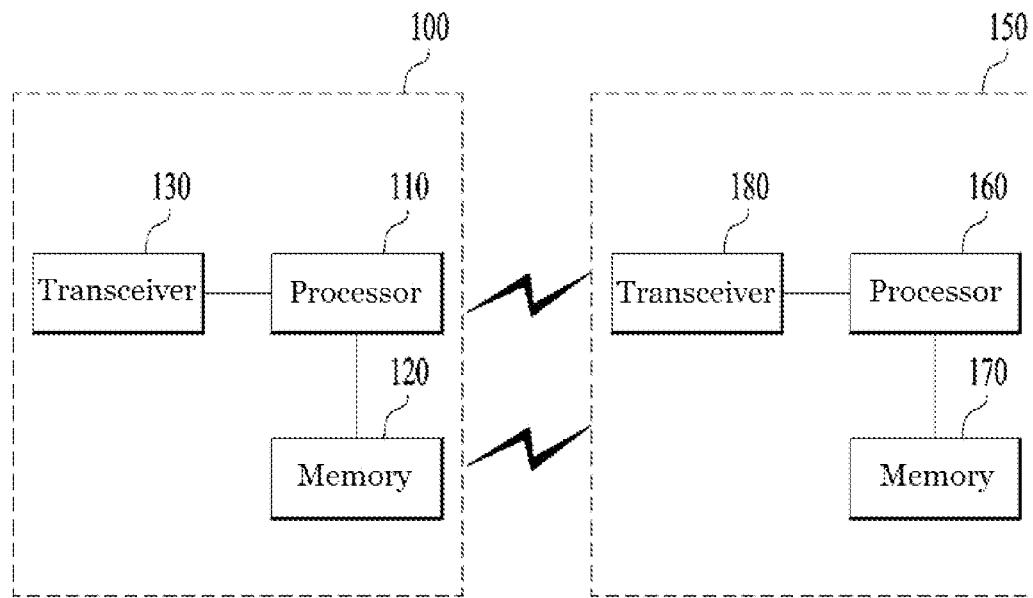
FIG. 18 is a block diagram showing an exemplary configuration of an access point (AP) apparatus (or a base station apparatus) and a station apparatus (or UE apparatus) according to an embodiment of the present invention.

FIG. 18 is a block diagram showing an exemplary configuration of an access point (AP) apparatus (or a base station apparatus) and a station apparatus (or UE apparatus) according to an embodiment of the present invention.

The AP 100 may include a processor 110, a memory 120 and a transceiver 130. The STA 150 may include a processor 160, a memory 170 and a transceiver 180.

The transceivers 130 and 180 may transmit/receive a radio frequency (RF) signal and implement a physical layer according to an IEEE 802 system, for example. The processors 110 and 160 may be respectively connected to the transceivers 130 and 180 to implement a physical layer and/or a MAC layer according to the IEEE 802 system. The processors 110 and 160 may be configured to perform operations according to combinations of one or more of the various embodiments of the present invention described above. In addition, modules for implementing operations of the AP and the STA according to the above-described embodiments of the present invention may be stored in the memories 120 and 170 and may be executed by the processors 110 and 160, respectively. The memories 120 and 170 may be mounted inside or outside the processors 110 and 160 to be connected to the processors 110 and 160 by known means, respectively.

The description of the AP apparatus 100 and the STA apparatus 150 is applicable to the base station apparatus and the UE apparatus in other wireless communication systems (e.g., LTE/LTE-A systems).

The detailed configurations of the AP and the STA apparatuses may be implemented such that details described in the above embodiments of the present invention are independently applied or two or more embodiments are simultaneously applied. In this case, overlapping details have been omitted from the description for clarity.

Figure 19:
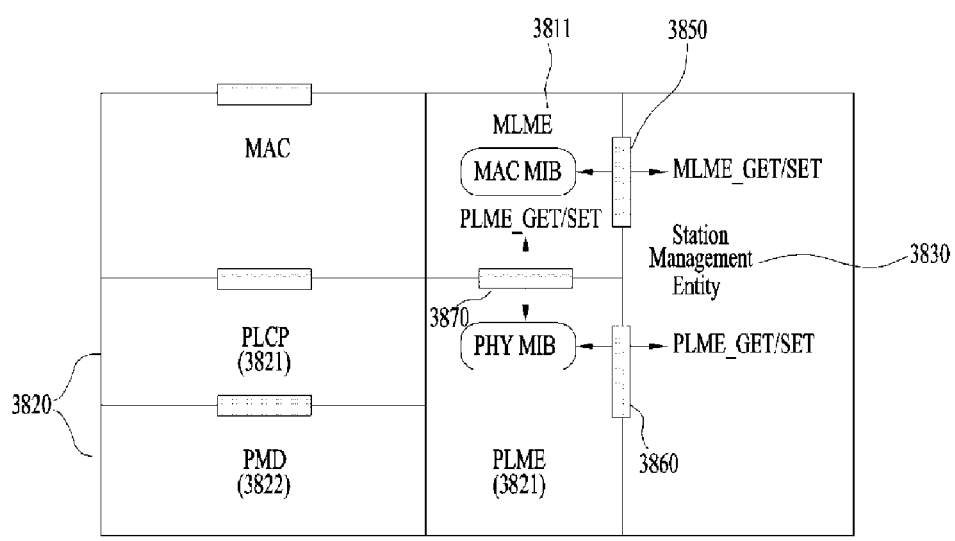
FIG. 19 is a diagram showing an exemplary structure of a processor of an AP apparatus or a station apparatus according to an embodiment of the present invention.

FIG. 19 is a diagram showing an exemplary structure of a processor of an AP apparatus or a station apparatus according to an embodiment of the present invention.

The processor of the AP or the STA may have a plurality of layers. FIG. 19 shows a MAC sublayer 3810 of a data link layer (DLL) and a physical (PHY) layer 3820 among the plurality of layers. As shown in FIG. 19, the PHY 3820 may include a physical layer convergence procedure (PLCP) entity 3821 and a physical medium dependent (PMD) entity 3822. The MAC sublayer 3810 and the PHY layer 3820 may respectively include management entities, which are respectively referred to as MAC sublayer management entities (MLME) 3811. These entities 3811 and 3821 provide a layer management service interface, for operation of a layer management function.

To provide accurate MAC operation, a station management entity (SME) 3830 may be included in each STA. The SME 3830 is a management entity independent of each layer, which is present in or off to one side of a separate management plane. Although the functions of the SME 3830 are not accurately described in detail in this specification, such an entity 3830 collects layer-dependent state information from several layer management entities (LMEs) and sets layer-specific parameter values. The SME 3830 may perform such functions on behalf of general system management entities and implement standard management protocols.

The entities shown in FIG. 19 may interact using various methods. FIG. 19 shows an example of exchanging GET/SET primitives. An XX-GET.request primitive is used to request a given management information base (MIB) attribute (management information based attribute information) value. An XX-GET.confirm primitive is used to return an appropriate MIB attribute information value if a status is "SUCCESS" and to, otherwise, return error indication in a status field. An XX-SET.request primitive is used to request setting of an indicated MIB attribute value to a given value. If the MIB attribute value indicates a specific operation, execution of the specific operation is requested. An XX-SET.confirm primitive is used to confirm that the indicated MIB attribute is set to the requested value if a status is "SUCCESS" and to, otherwise, return an error condition in a status field. If the MIB attribute value indicates a specific operation, this may indicate that the specific operation has been performed.

As shown in FIG. 19, various MLME GET/SET primitives may be exchanged between the MLME 3811 and the SME 3830 via an MLME Service access point (SAP) 3850. Alternatively, various PLCM GET/SET primitives may be exchanged between the PLME 3821 and the SME 3830 via a PLME SAP 3860 and may be exchanged between the MLME 3811 and the PLME 3870 via an MLME-PLME SAP 3870.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so that it can be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein. Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

Both apparatus and method inventions are mentioned in this specification and descriptions of both of the apparatus and method inventions may be complementarily applicable to each other.

INDUSTRIAL APPLICABILITY

Although it is assumed that the present invention is applied to an IEEE 802.11 based wireless local area network (WLAN) system, the present invention is not limited thereto. The present invention is applicable to various wireless systems.

What is claimed is:
1. A method for a first station (STA) to communicate with a second STA in a wireless local area network (WLAN), the method comprising:
    receiving, by the first STA from the second STA, resource allocation information for a plurality of STAs, including the first STA, wherein the first STA communicates with the second STA using orthogonal frequency divisional multiple access (OFDMA) or multi-user multiple input multiple output (MU-MIMO); and
    receiving, by the first STA from the second STA, data through a frequency band based on the resource allocation information,
    wherein the frequency band includes a plurality of resource units, the plurality of resource units including a normal resource unit allocated to one STA, and a multi-user resource unit which is a single resource unit allocated to more than one STA among the plurality of STAs,
    wherein the resource allocation information includes:
    a common resource allocation information having a same value for the plurality of STAs, and informing a number of the plurality of resource units and each size of the plurality of resource units, a multi-user indication for a number of STAs, among the plurality of STAs, to which the multi-user resource unit is allocated, and multiple ID fields for corresponding identification information of STA to which the normal resource unit or the multi-user resource unit is allocated.

2. The method of claim 1, wherein the ID fields include:
one or more first ID fields informing corresponding identification information of one or more STAs respectively allocated to the normal resource units, and
one or more second ID fields informing corresponding identification information of one or more STAs allocated to the multi-user resource unit.

3. The method of claim 1, wherein the plurality of resource units further includes a null subband which is not used to receive the data.

4. The method of claim 3, wherein the ID fields further include one or more third ID fields informing the null subband by using a specific value of the ID field.

5. The method of claim 4, wherein the specific value is a value other than values representing identifiers of the plurality of STAs.

6. A first station (STA) for communicating with a second STA in a wireless local area network (WLAN), the first STA comprising:
transceiver configured to receive resource allocation information for a plurality of STAs, including the first STA, wherein the first STA communicates with the second STA using orthogonal frequency divisional multiple access (OFDMA) or multi-user multiple input multiple output (MU-MIMO), and to receive data through a frequency band based on the resource allocation information from the second STA; and
a processor connected to the transceiver and configured to process the resource allocation information and the data, wherein the frequency band includes a plurality of resource units, the plurality of resource units including a normal resource unit allocated to one STA, and a multi-user resource unit which is a single resource unit allocated to more than one STA among the plurality of STAs, wherein the resource allocation information includes:
a common resource allocation information having a same value for the plurality of STAs, and informing a number of the plurality of resource units and each size of the plurality of resource units based on,
a multi-user indication for a number of STAs, among the plurality of STAs, to which the multi-user resource unit is allocated, and
multiple ID fields for corresponding identification information of STA to which the normal resource unit or the multi-user resource unit is allocated.

7. The first STA of claim 6, wherein the ID fields include:
one or more first ID fields informing corresponding identification information of one or more STAs respectively allocated to the normal resource units, and
one or more second ID fields informing corresponding identification information of one or more STAs allocated to the multi-user resource unit.

8. The first STA of claim 6, wherein the plurality of resource units further includes a null subband which is not used to receive the data.

9. The first STA of claim 8, wherein the ID fields further include one or more third ID fields informing the null subband by using a specific value of the ID field.

10. The first STA of claim 9, wherein the specific value is a value other than values representing identifiers of the plurality of STAs.

* * * * *